US008736588B2

(12) United States Patent
Tanaka et al.

(10) Patent No.: US 8,736,588 B2
(45) Date of Patent: May 27, 2014

(54) LIQUID CRYSTAL DISPLAY DEVICE

(75) Inventors: Yukio Tanaka, Ishikawa-ken (JP); Kenji Nakao, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 387 days.

(21) Appl. No.: 13/220,932

(22) Filed: Aug. 30, 2011

(65) Prior Publication Data

US 2012/0050240 A1 Mar. 1, 2012

(30) Foreign Application Priority Data

Aug. 31, 2010 (JP) ................................ 2010-194248

(51) Int. Cl.
*G06F 3/038* (2013.01)
*G06F 3/041* (2006.01)

(52) U.S. Cl.
USPC .......................................... 345/204; 345/173

(58) Field of Classification Search
USPC .......... 345/173, 174, 211, 212, 204, 206, 690
See application file for complete search history.

(56) References Cited

U.S. PATENT DOCUMENTS

2007/0103425 A1 5/2007 Tanaka et al.
2007/0115240 A1 5/2007 Tanaka et al.
2008/0278647 A1 11/2008 Fukami et al.
2008/0291152 A1 11/2008 Nakao et al.
2009/0009463 A1 1/2009 Tanaka et al.
2009/0033606 A1 2/2009 Tanaka et al.
2010/0245697 A1 9/2010 Shiiba et al.
2011/0025959 A1 * 2/2011 Cho et al. ...................... 349/106
2011/0122114 A1 5/2011 Tanaka et al.

FOREIGN PATENT DOCUMENTS

JP 4-165329 A 6/1992
JP 10-268261 A 10/1998
JP 11-109921 4/1999
JP 2004-117758 A 4/2004
JP 2005-241778 A 9/2005
JP 2007-140451 A 6/2007
JP 2009-192666 A 8/2009

OTHER PUBLICATIONS

Japanese Office Action Issued Jun. 12, 2012 in Patent Application No. 2010-194248 (English translation only).
Japanese Office Action issued Dec. 11, 2012 in Patent Application No. 2010-194248 (English Translation only).

* cited by examiner

*Primary Examiner* — Michael Faragalla
(74) *Attorney, Agent, or Firm* — Oblon, Spivak, McClelland, Maier & Neustadt, L.L.P.

(57) ABSTRACT

In one embodiment, a liquid crystal display device includes first and second areas respectively having a gate line group in an active area, and a dummy gate line group arranged on an outside of the active area. A driving circuit selects the gate lines of the gate line group and the dummy gate lines of the dummy gate line group one by one in the first and second areas. The driving circuit is independently controlled for the first and second areas. The gate lines are scanned from a center portion of the active area to the dummy gate line side in the first and second areas, respectively. An image signal and a non-image signal are written within one-frame period in the first and second areas.

5 Claims, 8 Drawing Sheets

LIQUID CRYSTAL DISPLAY DEVICE

CROSS-REFERENCE TO RELATED APPLICATION

This application is based upon and claims the benefit of priority from Japanese Patent Application No. P2010-194248, filed Aug. 31, 2010, the entire contents of which are incorporated herein by reference.

FIELD

Embodiments described herein relate generally to a liquid crystal display device.

BACKGROUND

In a recent television set using a liquid crystal display, the trend for enlargement and high-resolution of the display is notable. For example, the display having a big screen size larger than 40 inches and a resolution of full HD (1920×1080) is becoming a standard. Moreover, the demand for enlargement and high-resolution is also increasing about the display for personal computers.

Furthermore, in recent years, the liquid crystal television set compliant with a three-dimensional (3D) display (solid display) device is commercialized. A doubled speed frame frequency 120 Hz of the frame frequency (generally 60 Hz) of the standard 2D display (plane display) is used for displaying the 3D image by displaying images corresponding to left eye and right eye alternately.

Under the above circumstances, it is required that the bigger liquid crystal panel with high resolution be driven at a high speed. However, since resistance and capacitance of array wirings in the liquid crystal panel become larger, a time constant which is a product of the resistance and the capacitance also becomes larger with increasing in the screen size and the resolution. Therefore, it becomes difficult to carry out the high-speed drive. Although a trial which makes the time constant of the array wirings reduce using low resistance wiring materials, such as copper (Cu), is also performed, there is a limitation in the countermeasure by only the material development.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
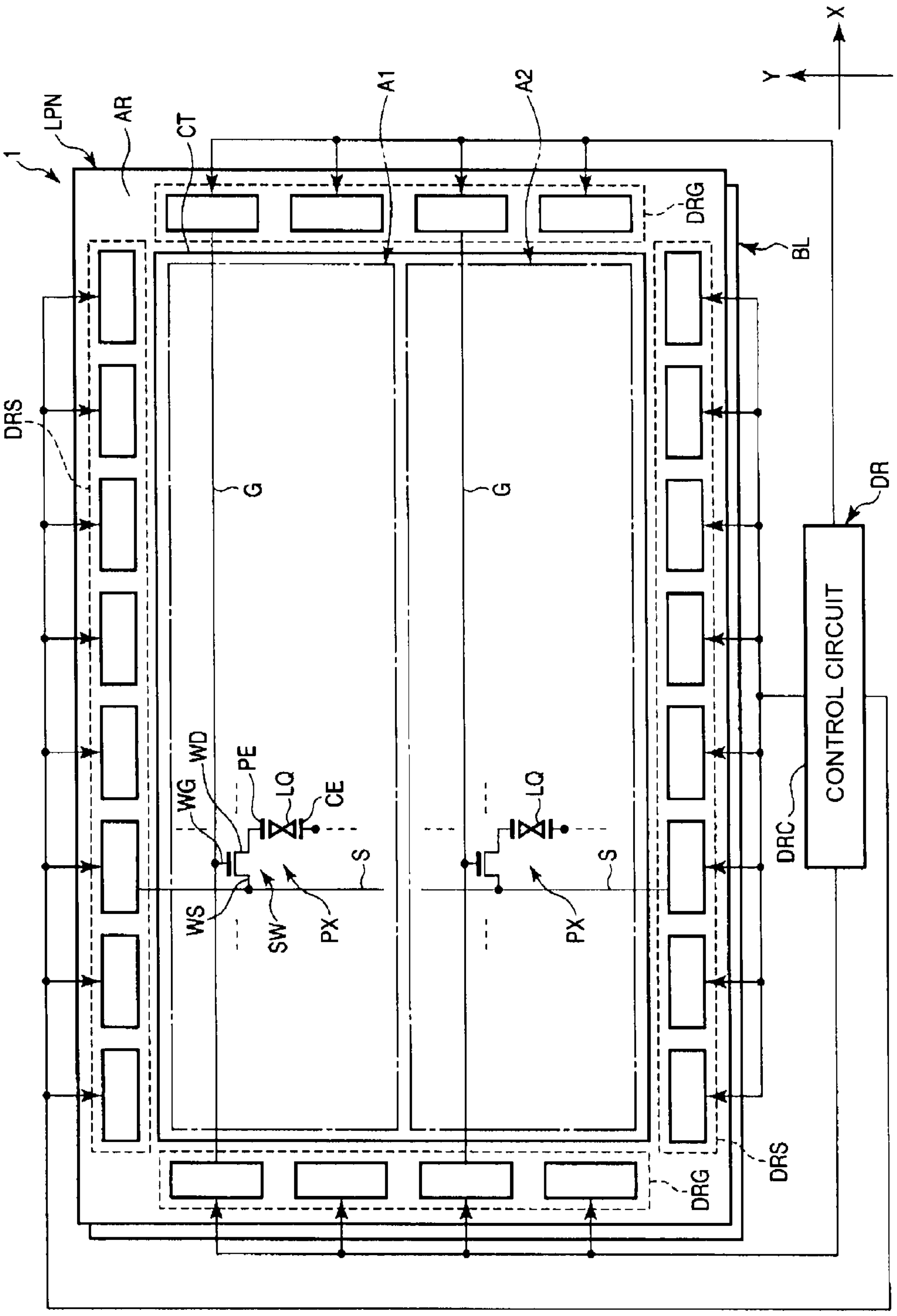
FIG. 1 is a figure schematically showing a structure of a liquid crystal display device according to an embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first area including a first gate line group formed of “a” gate lines arranged along a first row line to an a-th row line in an active area, and a first dummy gate line group formed of “b” dummy gate lines arranged outside the active area; a second area including a second gate line group formed of “c” gate lines arranged along an (a+1)th row line to an (a+c)th row line in the active area, and a second dummy gate line group formed of “d” dummy gate lines arranged outside the active area opposing the first dummy gate line group so as to interpose the active area therebetween; and a driving circuit for sequentially selecting the gate lines from the a-th row line of the first gate line group to the dummy gate line of the first dummy gate line group one by one in the first area, and for sequentially selecting the gate lines from the (a+1)th row line of the second gate line group to the dummy gate line of the second dummy gate line group one by one in the second area; wherein an image signal and a non-image signal are written within one-frame period in the first and second areas.

FIG. 1 is a figure schematically showing the structure of the liquid crystal display device according to one embodiment. The liquid crystal display device 1 includes a liquid crystal display panel LPN. The liquid crystal display panel LPN is constituted by an approximately rectangular array substrate AR, an approximately rectangular counter substrate CT arranged opposing the array substrate, and a liquid crystal layer LQ held between the array substrate AR and the counter substrate CT. The array substrate AR and the counter substrate CT are attached together by a seal material which is not illustrated. The array substrate AR extends in four sides beyond the counter substrate CT.

In the back side of the array substrate AR, a back light BL which illuminates the liquid crystal display panel LPN is arranged. Various forms can be used as such a back light BL. As a light source, light emitting diodes or a cold cathode fluorescent lamp, etc., can be applied, and the explanation is omitted about the detailed structure.

The liquid crystal display panel LPN as mentioned-above includes a first area A1 and a second area A2. When a first direction X is made horizontal in the illustrated example, the first area A1 is formed in an upper portion in the liquid crystal display panel LPN, and the second area A2 is formed in a lower portion in the liquid crystal display panel LPN. The area of the first area A1 is substantially the same as that of the second area A2.

A plurality of pixels PX (m×n) arranged in the shape of a matrix is formed in the first area A1 and the second area A2 (here, “m” and “n” are positive integers). The number of pixels PX formed in the first area A1 and the second area A2 is substantially the same. For example, the pixels PX of (m×n/2) are formed in each of the first area A1 and the second area A2. In the (m×n) pixels PX formed in the liquid crystal display panel LPN, in addition to the display pixels which contribute to the display, dummy pixels which do not contribute to the display are also contained as mentioned-later. The structure of the display pixel and the dummy pixel is substantially the same.

Each pixel PX includes a switching element SW, a pixel electrode PE, and a counter electrode CE, etc.

A plurality of gate lines G which respectively extends along a first direction X is formed in the array substrate AR. The total number of the gate lines G formed in the first area A1 and the second area A2 is "n". For example, n/2 gate lines G are formed in each of the first area A1 and the second area A2.

Moreover, a plurality of source lines S which extends along a second direction Y is respectively formed in the array substrate AR. The total number of the source lines S formed in the first area A1 is "m", and the source lines S intersect the n/2 gate lines G, for example. The total number of the source lines S formed in the second area A2 is also "m", and similarly, the source lines S intersect the n/2 gate lines G, for example. In addition, though the source lines S formed in the first area A1 and the source lines S formed in the second area A2 are located on an approximately same straight line, as illustrated, the respective source lines are cut near a boundary between the first area A1 and the second area A2.

Moreover, (m×n) switching elements SW and (m×n) pixel electrodes PE are formed in the array substrate AR.

The switching element SW is constituted by an n channel type thin film transistor (TFT), for example. The switching element SW is electrically connected with the gate line G and the source line S. That is, the gate electrode WG of the switching element SW is electrically connected with the gate line G. The source electrode WS of the switching element SW is electrically connected with the source line S. The drain electrode WD of the switching element SW is electrically connected with the pixel electrode PE.

The pixel electrode PE and the counter electrode CE are formed of transparent oxide conductive materials, such as Indium Tin Oxide (ITO) and Indium Zinc oxide (IZO), for example. The pixel electrodes PE and the counter electrode CE are covered with an alignment film which is not illustrated.

In this embodiment, the liquid crystal display panel LPN adopts a liquid crystal layer LQ of OCB (Optically Compensated Bend) mode. That is, the OCB mode drives the liquid crystal molecules which constitute the liquid crystal layer LQ mainly using a vertical electric field formed between the pixel electrode PE on the array substrate AR and the counter electrode CE on the counter substrate CT (namely, a vertical electric field perpendicular with the principal surface of the substrate).

Moreover, the liquid crystal display 1 includes a driver circuit DR. The drive circuit DR is constituted by a control circuit DRC, a gate driver DRG, and a source driver DRS.

The gate driver DRG is arranged at two sides of the right and left in the second direction Y of the liquid crystal display panel LPN, respectively. The "n" gate lines G are connected to the gate driver DRG. The drive timing is controlled by the control circuit DRC, and the gate driver DRG outputs a selection signal which selects the gate line G at a suitable timing, that is, when the switching element SW connected to the gate line G is switched to ON state. In addition, in the illustrated example, although the gate driver DRG is arranged at right and left sides, respectively, the gate driver DRG may be arrange only in one side.

The source driver DRS is respectively arranged at two sides of the upper and lower sides of the liquid crystal display panel LPN along with the first direction X. The "m" source lines S formed in the first area A1 is connected to the source driver DRS arranged at the upper portion of the liquid crystal display panel LPN. Moreover, the "m" source lines S formed in the second area A2 is connected to the source driver DRS arranged at the lower portion of the liquid crystal display panel LPN.

Therefore, it is possible to write image signals independently to each of source lines S of the first area A1 and the second area A2. The drive timing of the source driver DRS is controlled by the control circuit DRC, and the source driver DRS outputs the image signal or a non-image signal corresponding to the source line S at a suitable timing, that is, the timing when the corresponding gate line G is selected.

Thus, the structure divided into the first area A1 and the second area A2 is suitable one for the trend of the times i.e., big screen, high resolution, and improvement in the operating speed. The driving time is made to one half because both the wiring resistance and the capacitance of the source line S driven by the source driver DRS respectively become half respectively, and a parallel processing is carried out by the up-and-down source drivers DRS.

Although the number of the source drivers DRS is needed twice in the structure according to this embodiment as compared with the structure arranged in one side of the liquid crystal display panel LPN, the proportion of the source driver cost in the total cost of the liquid crystal display 1 is comparatively small in the display having a big screen. Therefore, the cost increase does not become a problem so much.

By the way, there is a black insertion drive as one of the driving methods of the liquid crystal display panel LPN. The driving method is a technique of making an impulse type luminance response similar to that of CRT by displaying a black picture between continuous frame periods, and thereby clearing a retina afterimage produced in an observer's vision and showing a motion of an object smoothly. The driving method is focused as one technology which dramatically raises a moving image visibility.

Moreover, since the image of one frame is completely separated by a following frame by interleaving a black insertion period, the driving method is suitable for the 3D display which displays a right-and-left image alternately for one frame period. In the 3D display, a good image is obtained without a cross talk, that is, a phenomenon in which the image for left eye mixes with the image for right eye causing a doubled image.

In addition, in the black insertion drive, it is desirable for the liquid crystal mode itself to have a high-speed response characteristics to perform further improvement in the moving image visibility or the 3D cross talk reduction. The OCB mode applied to this embodiment is the liquid crystal mode suitable for such a demand. In the case of the OCB mode, it is necessary to impress a high voltage by a certain time ratio for preventing an inverse transition. However, in the black insertion drive, the black insertion period itself can be made into the high-voltage impression period, which is convenient.

Next, the scan timings of the black insertion in the black insertion drive, i.e., the writing of a non-image signal, and the writing of the image signals are explained referring to a practical example. The liquid crystal display according to this embodiment performs the writing of the non-image signal and the writing of the image signal within one-frame period.

Figure 2:
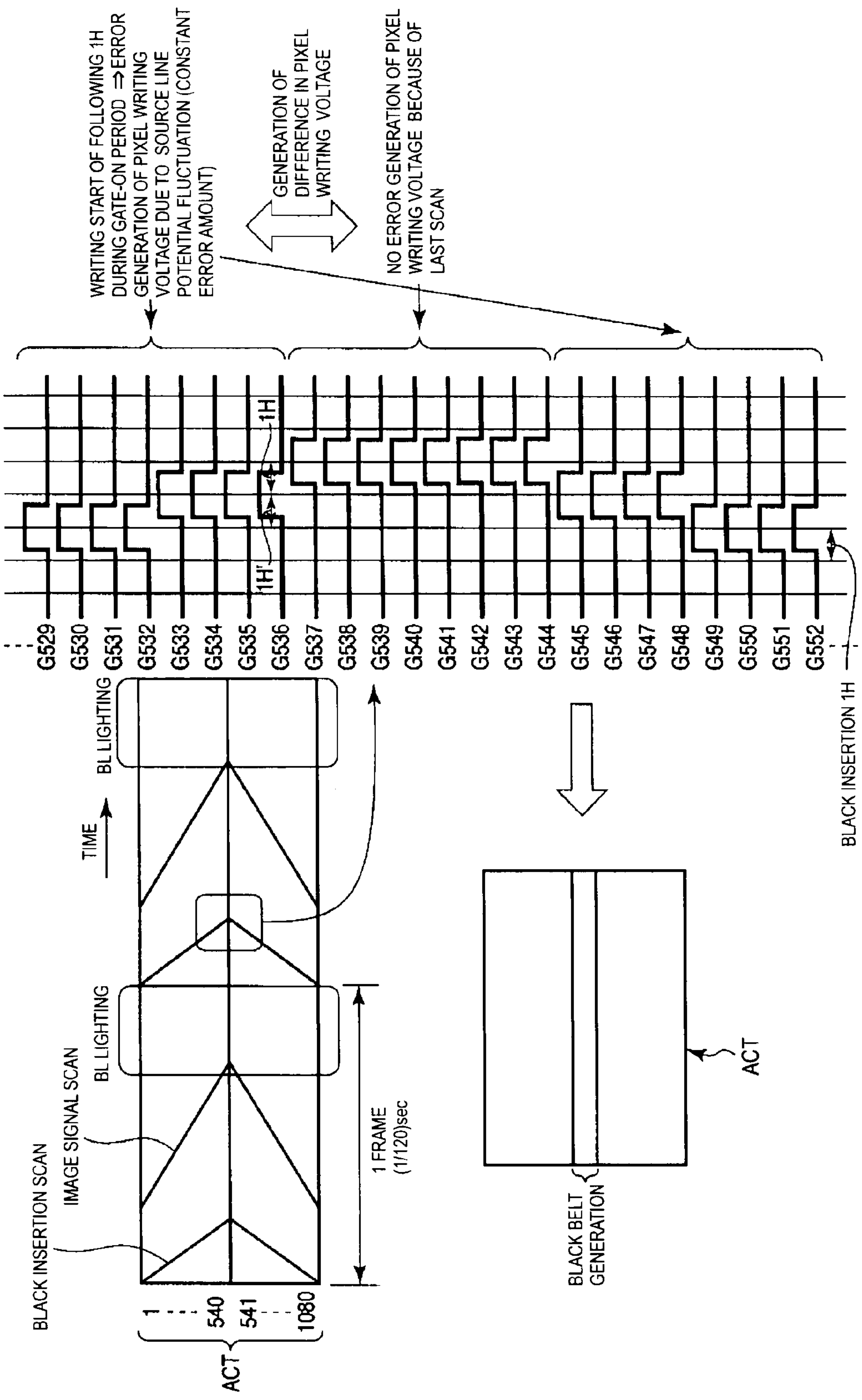
FIG. 2 is a figure for explaining an example of a scan timing.

FIG. 2 is a figure for explaining an example of the scan timing. In FIG. 2, the active area ACT which displays the images is formed of 1080 row lines. At this time, the upper half (the first row line-the 540th row line) of the active area ACT is contained in the first area A1 as mentioned-above, and the lower half (the 541th row line-the 1080th row line) of the active area ACT is contained in the second area A2 as mentioned-above.

The source driver DRS arranged at the upper portion of the liquid crystal display panel LPN outputs the image signals and the non-image signals to the source lines S which intersect each gate line G at the upper half portion (the first row line-the 540th row line). The source driver DRS arranged at the lower portion of the liquid crystal display panel LPN outputs the image signals and the non-image signals to the source lines S which intersect each gate line G of a lower half portion (the 541th row line-the 1080th row line).

The scan of the upper half portion and the lower half portion is performed in parallel in time, and the scan is performed in a direction from both ends to the center portion of the active area ACT. That is, the upper half portion is scanned toward the 540th row line from the first line, i.e., an upper end of the active area ACT, and the lower half portion is scanned toward the 541th row line from the 1080th row line, i.e., a lower end portion of the active area ACT.

If only the upper half portion of the active area ACT is focused, the black insertion scan which writes the black image signal i.e., the non-image signal, from the first row line to the 540th row line is performed. Similarly, the image signal scan which writes the image signal from the first row line to the 540th row line after the writing of the black image, and the back light BL is turned on to emit light in a remaining time (holding period) in one-frame period. The same operation, which is a reverse operation of the upper half operation, is performed for the lower half portion.

Here, the black insertion scan is performed by selecting four row lines by a package (total eight-line package for the respective upper and lower portions). The package selection is possible because the same black image signals, i.e., the same black voltages are written in all the row lines in the black insertion. Therefore, the scan rate can be increased by 4 times by carrying out the package selection, and the holding time corresponding to the back light lighting can be secured. On the contrast, in the image signal scan, it becomes indispensable to select one row line in order to write the image signal corresponding to each row line one by one.

In addition, the black insertion is not performed by the four-line package necessarily, and theoretically, it is also possible to adopt a six-line package or an eight-line package, etc., which enables high-speed scan. However, if the row lines are selected too many, since the load of the signal writing becomes large, a large current flows into the source driver DRS in instant and more load is placed. Therefore, it is not desirable to package too many row lines. In the packaging, it is necessary to select a suitable number of the row lines considering the balance of the merit of the high-speed scan and the source driver load. Hereinafter, the explanation is made by taking the case of the four-row-line package.

By the way, in the black insertion scan, the period for the scan in one-horizontal period (1H) is very short even in a case where an up-and-down two divisional drive is carried out. For example, in a case where the four-row-line package selection by the 120-Hz drive is made corresponding to the 3D display, and the black insertion scan completes in 10% of one-frame period, the one horizontal period becomes ($1/120$) sec×0.1/(540/4)≈6 μsec. Within the period, such following successive operations as a raising of a gate, that is, the switching element SW connected to the gate line G is changed to ON state, the writing of the black image signal in the pixel PX through the source line S, and making fall of the gate, that is, the switching element SW connected to the gate line G is changed to OFF state, are performed. Therefore, the writing-in time to the pixel PX runs short.

Then, in order to avoid such unfavorable state, a technique (early gate driving) to preliminary start the raising of the gate in a preceding horizontal period is used. By carrying out above operation, the write-in time to the pixel PX can be secured, and the black voltage required to carry out the black insertion can be certainly written in the pixel PX.

However, in the above-mentioned driving method, when a whole black image display or a gray image display is performed, a defect in which a horizontal belt-like image is generated in the center of the active area ACT was checked. The belt-like image was generated near a boundary line between the upper half portion and the lower half portion of the active area ACT, and has a width of eight row lines.

The inventors analyzed the horizontal belt-like image generation phenomenon and traced the cause of the generation as explained hereinafter.

A gate scan waveform at the time of the black insertion scan near the horizontal belt-like image portion is shown in the right-hand side of FIG. 2. The upper half portion is scanned in order, the 529th row line-the 532th row line, the 533th row line-the 536th row line, and the 537th row line-the 540th row line, and a lower half portion is scanned in order, the 549th row line-the 552th row line, the 545th row line-the 548th row line, and the 542th row line-the 544th row line.

First, the upper half portion is focused. During the selection period in which the gate lines G529-G532 of the 529th row line-the 532th row line are selected, and are set to ON state, the potential of the following gate lines G533-G536 of the 533th row line-the 536th row line rises, and the selection is started by the early gate driving. That is, a portion of the selected period of the gate lines G529-G532 and selected period of the gate lines G533-G536 overlaps. In other words, the selected period when the gate lines G533-G536 are selected contains one horizontal period(1H) and a preliminary write-in period (1H'), which is a preceding one-horizontal period earlier than the horizontal period (1H).

Similarly, during the selected period in which the gate lines G533-G536 of the 533th row line-the 536th row line are selected, and set to the ON state, the potential of the following gate lines G537-G540 of the 537 row line-the 540th row line rises, and the selection is started.

Thus, since the writing to other row lines is started during the selected period when certain four gate lines are set to the ON state, the source line potential is fluctuated momentarily and an error occurs in the write-in potential in the four pixels PX in the ON period. However, the amount of error at this time is the same as every four lines. On the other hand, since the 537th row line-the 540th row line are the last scan row lines, the writing to other row lines is not started during the selected period when the gate lines are set to the ON state. Therefore, the error does not occur about the write-in potential in the pixels PX of the 537th row line-the 540th row line.

The same operation is performed for the lower half portion. Though certain quantity of error occurs in the write-in potential in the pixels PX of the 549th row line-the 552 row line, and pixels PX of the 545th row line-the 548th row line, the error does not occur about the write-in potential in the pixels PX of the 541st row line-the 544th row line.

That is, in the full screen, the write-in error does not occur exceptionally in the eight row lines of 537th row line-the 544th row line, and the potential held in the pixels PX differs from that held in the pixels of other row lines. Therefore, it is thought that the horizontal belt-like image is sighted.

Figure 3:
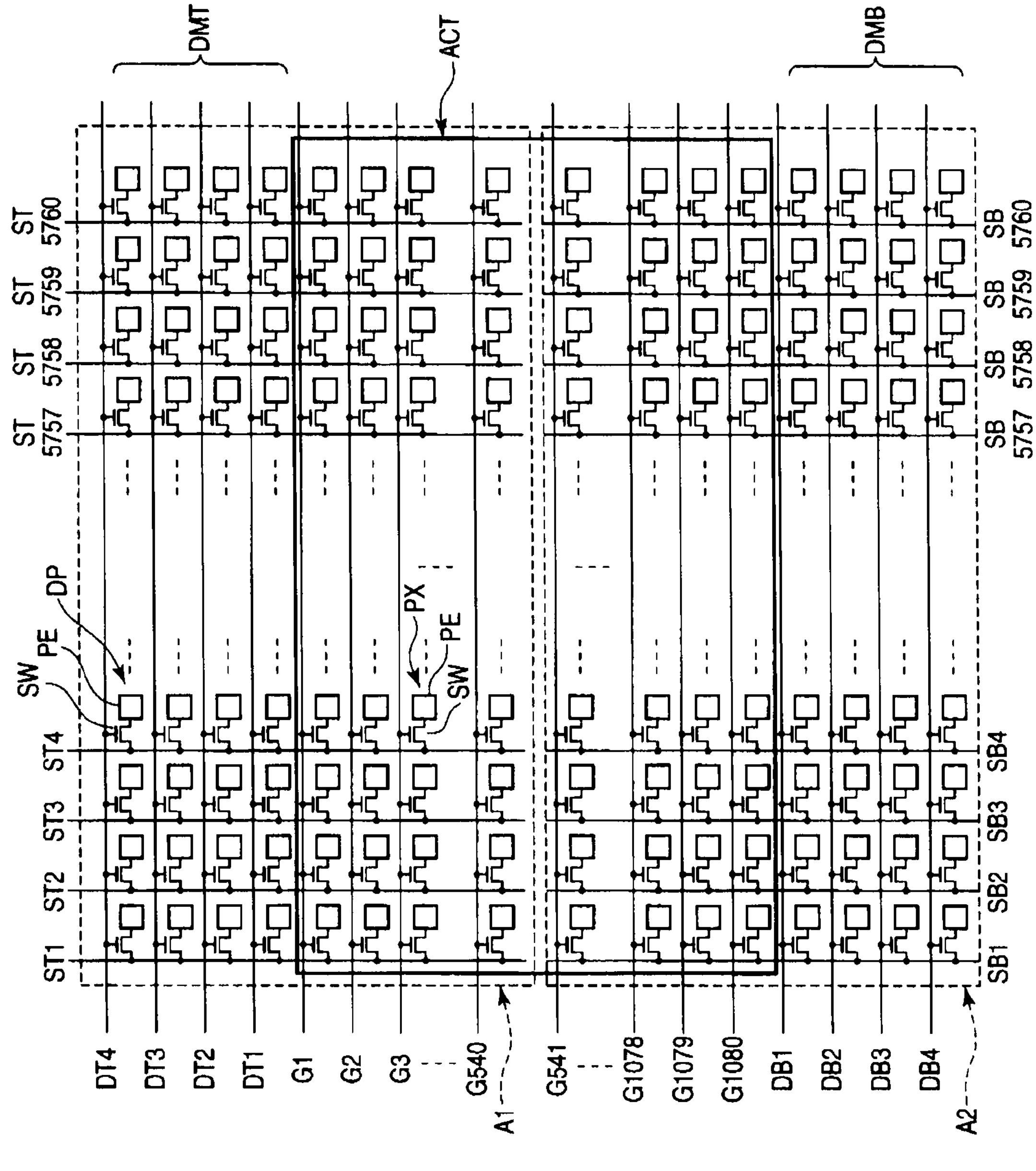
FIG. 3 is a figure for explaining a pixel arrangement of an array substrate which constitutes a liquid crystal display panel according to the embodiment.

Next, the pixel arrangement in this embodiment is explained. FIG. 3 is a figure for explaining the pixel arrangement of the array substrate AR which constitutes the liquid crystal display panel LPN according to this embodiment.

The active area ACT includes pixels PX arranged (1920×3)×1080 in the shape of a matrix. Moreover, a dummy region DMT arranged on the upper side of the active area ACT includes dummy pixels DP arranged in the shape of a matrix of (1920×3)×4. Similarly, a dummy region DMB arranged on the lower side of the active area ACT includes the dummy pixels DP arranged in the shape of a matrix of (1920×3)×4.

The pixels PX and the dummy pixels DP are configured with same structure and include the switching elements SW and the pixel electrodes PE, respectively. The dummy pixel DP is configured so that the dummy pixel DP does not contribute to the display optically, although the writing is electrically performed like the pixels PX. For example, the dummy regions DMT and DMB are configured so that the dummy regions DMT and DMB are shield with a shielding film formed on the counter substrate which is not illustrated.

The first area A1 includes the upper half portion of the active area ACT and the dummy region DMT. That is, the first area A1 includes a first gate line group of 540 gate lines formed of G1 to G540 arranged from the first row line to the 540th row line, a first dummy gate line group formed of four dummy gate lines DT1 to DT4 arranged along from the first row line to the fourth row line in the dummy region DMT, and a first source line group formed of 5760 source lines from ST1 to ST5760 which intersect the first gate line group and the first dummy gate line group.

The second area A2 includes the lower half portion of the active area ACT and the dummy region DMB. That is, the second area A2 includes a second gate line group formed of 540 gate lines from G541 to G1080 arranged from the 540th line to the 1080th line, a second dummy gate line group formed of four dummy gate lines DB1 to DB4 arranged along from the first row line to the fourth row line in the dummy region DMB, and a second source line group formed of 5760 source lines from SB1 to SB5760 which intersect the second gate line group and the second dummy gate line group.

Figure 4:
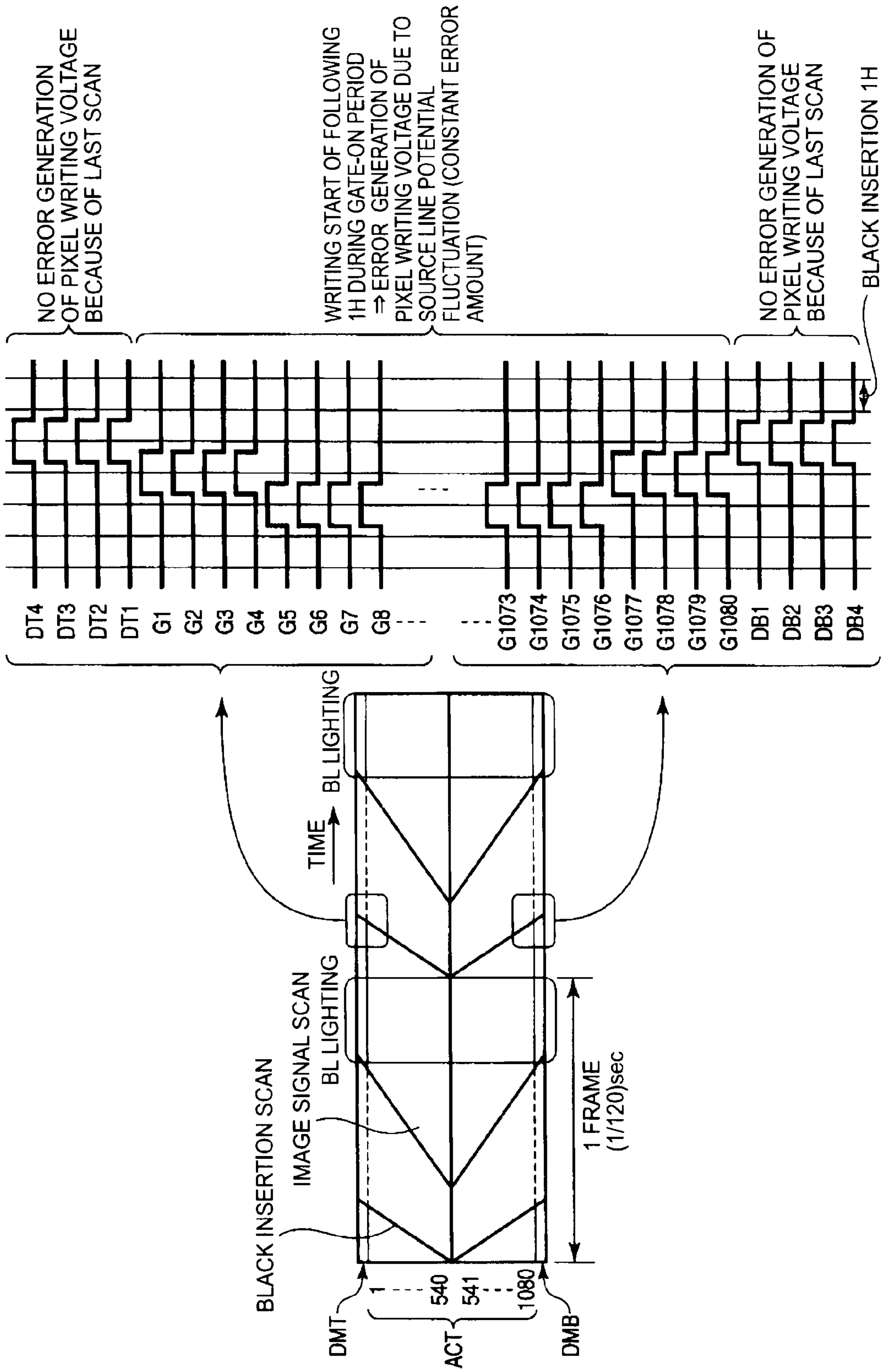
FIG. 4 is a diagram for explaining an example of the scan timing applicable to the liquid crystal display panel according to the embodiment shown in FIG. 3.

FIG. 4 is a figure for explaining an example of a scan timing applicable to the liquid crystal display panel LPN according to the embodiment shown in FIG. 3.

In the embodiment shown in FIG. 4, though the scan of the upper half portion and the lower half portion of the active area ACT is performed in parallel in time as the example shown in FIG. 2, each of the scan directions of the upper half portion and the lower half portion of the active area ACT are different from the example shown in FIG. 2 in that the scan is performed from the central portion to the end portion of the panel LPN. That is, the upper half portion is scanned toward the first row line that is an upper end from the 540th row line that is a center of the active area ACT, and the lower half portion is scanned toward the 1080th row line that is a lower end portion from the 541st row line that is a center of the active area ACT.

More specifically, in the first area A1, after the gate lines from the gate line G540 of the 540th row line to the gate line G1 of the first row line which is an upper end of the active area ACT of the active area ACT is selected one by one, the gate lines are further selected till the dummy gate line DT4 of the dummy region DMT. In the second area A2, after the gate lines from the gate line G541 of the 541th row line to the gate line G1080 of the 1080th row line which is a lower end portion of the active area ACT are selected one by one, the gate lines are further selected till the dummy gate line DB4 of the dummy region DMB A gate scan waveform according to this embodiment is shown in the right-hand side of FIG. 4. Also, in this embodiment, the black insertion scan is performed by selecting four row lines as a package (an eight-line package for the upper and lower portions). Here, the waveform is shown focusing on a last portion of the black insertion scan. That is, each gate lines G1-G8 of the first row line-the eighth row line, each gate lines G1073-G1080 of the 1073th row line-the 1080th row line in the active area ACT, and respective dummy gate lines DT1-DT4 of the first row line-the fourth row line of the upper dummy region DMT, and respective dummy gate lines DB1-DB4 of the first row line-the fourth row line of the lower dummy region DMB are shown.

In this figure, the gate lines and the dummy gate lines are selected in the first area A1 in order of respective gate lines G5-G8 of the fifth row line-the eighth row line, respective gate lines G1-G4 of the first row line-the fourth row line, and respective dummy gate lines DT1-DT4 of the first row line-the fourth row line of the dummy region DMT. In the second area A2, the gate lines and the dummy gate lines are selected in order of respective gate lines G1073-G1076 of the 1073th row line-the 1076th row line, respective gate lines G1077-G1080 of the 1077th row line-the 1080th row line, and respective dummy gate lines DB1-DB4 of the first row line-the fourth row line of the dummy region DMB.

First, when the first area A1 is focused, during the selected period in which the gate lines G5-G8 of the fifth row line-the eighth row line are selected and are set to ON state, the selection of the following gate lines G1-G4 of the first row line-the fourth row line rises and selection is started by the early gate driving. Similarly, during the selected period in which the gate lines G1-G4 of the first row line-the fourth row line are selected and are set to ON state, the potential of the following dummy gate lines DB1-DB4 rises and the selection is started.

Thus, since the writing to other row lines is started during the selected period when certain four row lines are set to ON state, the source line potential is fluctuated momentarily and an error occurs in the write-in potential in the pixels PX of four lines in the ON period. That is, the error of a certain amount occurs in the write-in potential in the pixels PX of the first row line (G1)-the fourth row line (G4), and pixels PX of the fifth row line (G5)-the eighth row line (G8). However, the amount of error at this time is the same for respective groups of four row lines.

On the other hand, about four row lines of the dummy region DMT, since the scan is performed lastly, the writing to other row lines is not started during the selected period when the dummy gate lines DT1-DT4 corresponding to the four row lines are set to ON state. Therefore, the error is not generated in the write-in potential in the dummy pixels DP.

Similarly, in the second area A2, though a certain quantity of error occurs in the write-in potential in the pixels PX of the 1073rd row line-the 1076th row line, and the pixels PX of the 1077th row line-the 1080th row line, the error does not occur about the write-in potential in the dummy pixels DP of four row lines of the dummy region DMB.

That is, in the whole region of the first area A1 and the second area A2, the pixels in which the write-in error does not occur exceptionally are only the dummy pixels DP of the total eight row lines of respective four lines of the upper dummy region DMT and the lower dummy region DMB. A substantially same quantity of error occurs in other row lines, i.e., the pixels PX of the first row line (G1)-the 1080th row line (G1080) which constitute the active area ACT.

Thus, although the write-in error occurs in the whole active area ACT, since the amount of error is uniform, it becomes possible to suppress the generation of the horizontal belt-like image. Although the display unevenness corresponding to the horizontal belt-like image shown in FIG. 2 is generated respectively in the four row lines of the dummy region DMT and the dummy region DMB in FIG. 4, the pixels arranged in the horizontal belt-like image are the dummy pixels DP which do not contribute to a display. Therefore, the horizontal belt-like image is not sighted, and it becomes possible to offer the liquid crystal display device with a high quality display.

In this explanation, though the scan of the active area ACT is started from the 540th row line in the first area A1 and from the 541st row line in the second area A2, the starting row lines are not limited to this example.

Namely, the first area A1 includes a first gate line group formed of "a" gate lines G arranged along the first row line to the a-th row line in the active area ACT, and further a first dummy gate line group formed of "b" dummy gate lines DT arranged outside the active area ACT. The second area A2 includes a second gate line group formed of "c" gate lines G arranged along an (a+1)th row line to an (a+c)th row line of the active area ACT, and a second dummy gate line group formed of "d" dummy gate lines DB arranged on the outside of the active area ACT opposing the first dummy group so as to interpose the active area ACT therebetween. In the first area A1, while selecting from the gate line Ga of the a-th row line of the first gate line group to the dummy gate line DT of the first dummy gate line group one by one, the scan is performed from the gate line G (a+1) of the (a+1) th row line of the second gate line group to the dummy gate line DB of the second dummy gate line group one by one in the second area A2.

According to the above-mentioned embodiment, although the horizontal belt-like image generation in the center of the active area ACT is avoided in the black insertion scan. However, a horizontal belt-like image having a width of two thinner lines may be generated in the center of the active area ACT in the image signal scan. This phenomenon is explained below.

Figure 5:
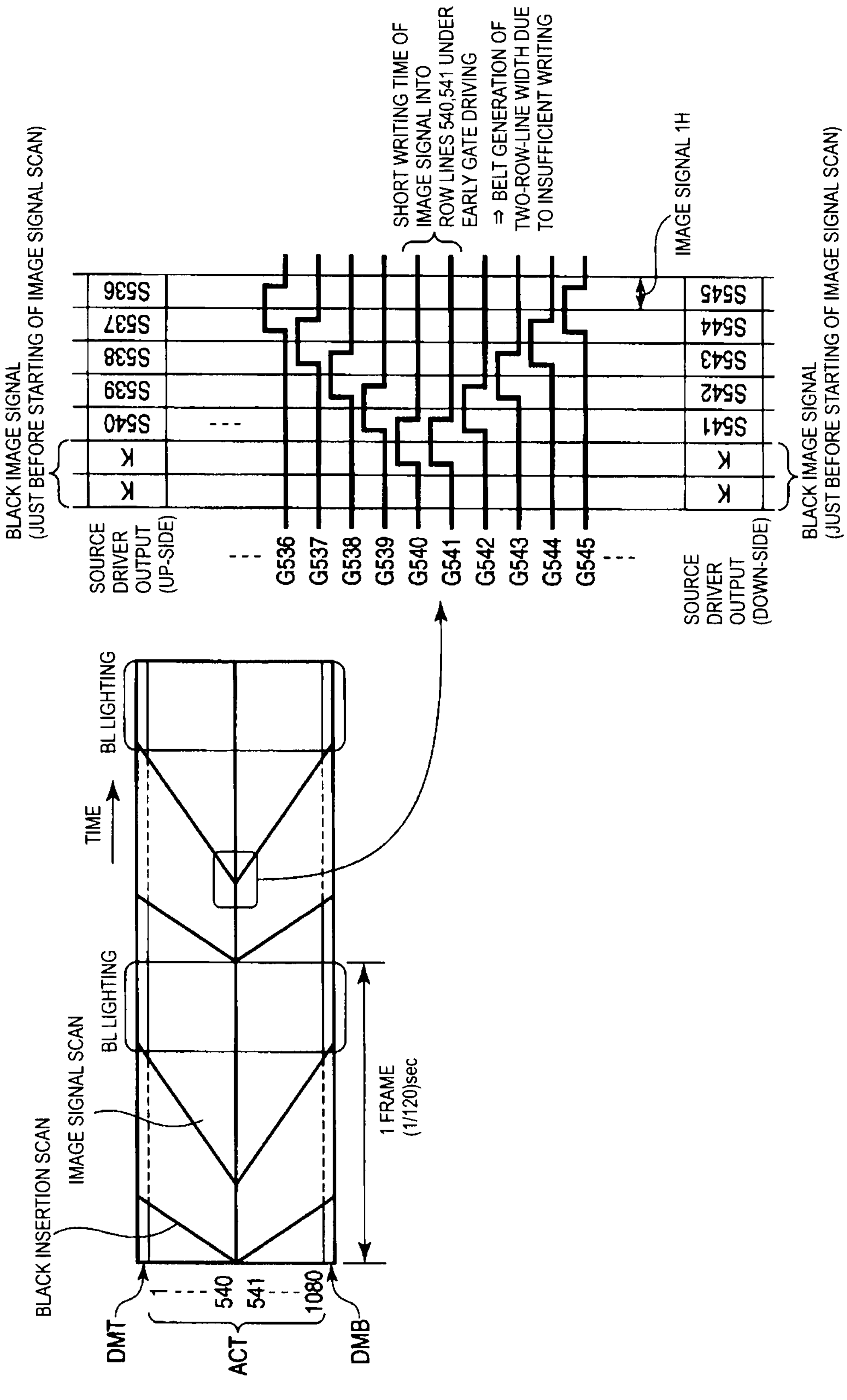
FIG. 5 is a figure showing a gate scan waveform in a start portion of an image signal scan in the scan timing diagram shown in FIG. 4.

FIG. 5 is a figure showing the gate scan waveform near the start portion of the image scan in the scan timing diagram shown in FIG. 4.

The image signal scan is performed by selecting the row lines one by one to write the image signal corresponding to each row line one by one as above-mentioned. That is, in the first area A1, the scan is sequentially performed from the 540th row line to the 539th row line, the 538th row line, . . . . Similarly, in the second area A2, the scan is sequentially performed from the 541st row line to the 542nd row line, the 543 row line, . . . .

Also in this image scan, an early gate driving method is adopted to secure the write-in time of the image signal to the pixels PX. Moreover, the source driver DRS which drives the first area A1 and the second area A2 in accordance with the early gate driving method outputs the image signals corresponding to one horizontal period (1H).

For example, during one horizontal period(1H) in which the respective switching elements SW connected to the gate line G539 of the 539th row line and the gate line G542 of the 542nd row line are ON state, the image signals S539 and S542 respectively corresponding to each row line are simultaneously outputted.

Right before the first image signals S540 and S541 are outputted, the signals are the black image signal K.

When performing a whole display throughout the first area A1 and the second area A2, the case where the image signal voltage corresponding to all the row lines is constant is considered. While each gate line is selected and set to ON state in the row lines above the 539th row line of the first area A1, and the row lines below the 542nd row line of the second area A2, since the source driver outputs a certain image signal voltage, the image signal is written in each pixel PX.

On the contrast, in the 540th row line of the first area A1 and the 541st row line of the second area A2, black voltages corresponding to the black image signal K are written in the pixels PX for a while after each gate line is selected and set to ON state, and then the image signals (S540 and S541) are written, respectively. For this reason, the substantial image signal write-in time becomes short compared with other row lines. That is, it results in an insufficient writing of the image signal for the 540th row line and the 541st row line. The potential held in the pixels becomes different from that held in the pixels arranged in other row lines, and which results in a horizontal belt-like image of two-line width.

Figure 6:
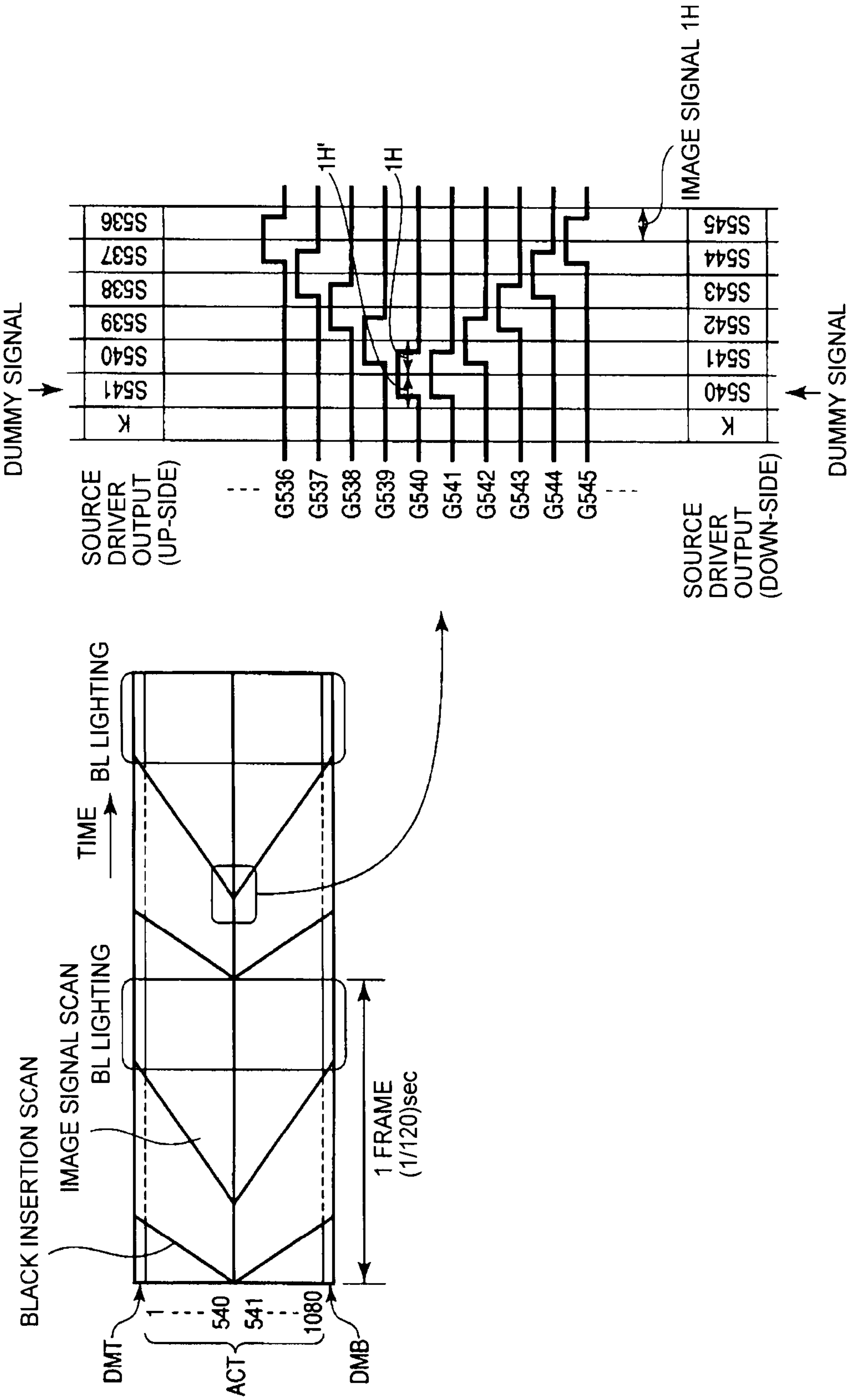
FIG. 6 is a figure for explaining an example of the image signal scan applicable to the liquid crystal display panel according to a second embodiment.

FIG. 6 is a figure for explaining an example of the image signal scan applicable to the liquid crystal display panel LPN according to a second embodiment.

Here, while outputting the image signal S541 right before outputting the image signal S540 in the upper source driver DRS, the image signal S540 is outputted right before outputting the image signal S541 in the lower source driver DRS. In this structure, when the early gate driving method is adopted, the image signal S540 is written in the one horizontal period 1H in the select period when the gate line G540 of the 540th row line is selected, and the image signal S541 is further written in an immediately preceding preliminary write-in period 1H' as a dummy signal. Similarly, in the select period when the gate line G541 of the 541st row line is selected, the image signal S541 is written in the horizontal level period 1H, and the image signal S540 is further written in an immediately preceding preliminary write-in period 1H' as a dummy signal.

When performing a whole display throughout the first area A1 and the second area A2, stable image signals are written in the pixels PX also in the selected period of the gate line G540 of the 540th row line and the gate line G541 of the 541st row line, and the write-in conditions of the image signals become the same as that of the pixels PX of other row lines. For this reason, the potential held in each pixel PX also becomes same as that of other row lines. Accordingly, it becomes possible to suppress the generation of the belt-like image in the central area of the active area ACT and to offer a liquid crystal display device with high quality display.

In addition, same effect is obtained in a modification of the second embodiment in which, for example, the upper source driver DRS outputs the image signal S540 in an immediately preceding write-in period 1H' prior to output the image signal S540 in the horizontal period 1H, and the lower source driver DRS outputs the image signal S541 in an immediately preceding write-in period 1H' prior to output the image signal S541 in the horizontal period H, i.e., the system which outputs the same image signals for 2H periods continuously. Anyway, the same effect is acquired by writing the image signal of any one of the row lines in the preliminary write-in period in the select period of the gate line G540 of the 540th row line and the gate line G541 of the 541st row line.

Figure 7:
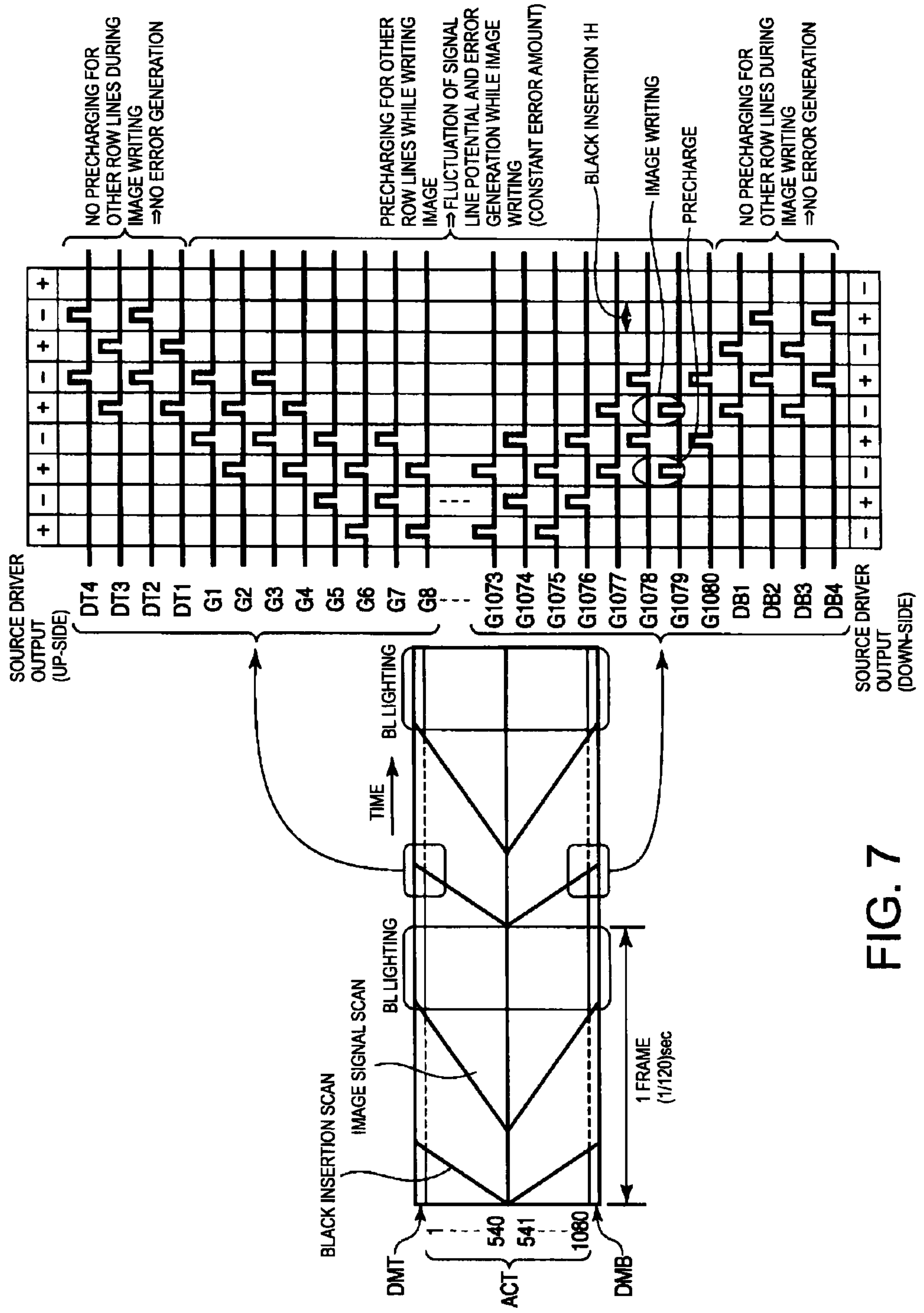
FIG. 7 is a diagram for explaining the scan timing according to a third embodiment applicable to the liquid crystal display panel shown in FIG. 3.

Next, a third embodiment is explained. FIG. 7 is a figure for explaining the scan timing applicable to the liquid crystal display panel LPN according to the third embodiment.

Although the case where the image signal polarity of each row line is the same i.e., a frame inversion or a column inversion is employed in the embodiment shown in FIG. 4, the third embodiment shown in FIG. 7 employs a dot inversion or a line inversion. In addition, the point that each of scan direction of the first area A1 and the second area A2 are set from a center to an end of the panel LPN, and that the dummy pixels DP for four row lines in each of the upper dummy region DMT and the lower dummy region DMB, is the same as that of the embodiment shown in FIG. 4.

The gate scan waveform in this embodiment is shown in the right-hand side of FIG. 7. Here, particularly, the last portion of the black insertion scan is shown. Each of the gate lines G1-G8 of the first row line-the eighth row line of the active area ACT, each of gate lines G1073-G1080 of the 1073rd row line-the 1080th row line, each of dummy gate lines DT1-DT4 of the first row line-the fourth row line of the upper dummy region DMT, and each of dummy gate lines DB1-DB4 of the first row line-the fourth row line of the lower dummy region DMB are respectively shown.

In this embodiment, the black insertion scan is performed with a package of two row lines different from the first embodiment shown in FIG. 4. That is, in total, four row lines are simultaneously selected for upper and lower portions.

In this figure, in the first area A1, each of gate lines G6 and G8 of the sixth row line and the eighth row line, each of gate lines G5 and G7 of the fifth row line and the seventh row line, each of gate lines G2 and G4 of the second row line and the fourth row line, and each of gate lines G1 and G3 of the first row line and the third row line are selected in this order. Furthermore, in the upper dummy region DMT, each of dummy gate lines DT1 and DT3 of the first row line and the third row line and each of dummy gate lines DT2 and DT4 of the second row line and the fourth row lines are selected in this order.

Moreover, in the second area A2, each of gate lines G1073 and G1075 of the 1073rd row line and 1075th row line, each of gate lines G1074 and G1076 of the 1074th row line and the 1076th row line, each of the gate lines G1077 and G1079 of the 1077th row line and the 1079th row line, and each of gate lines G1078 and G1080 of the 1078th row line and the 1080th row line are selected in this order in the active area ACT. Further, in the lower dummy region DMB, each of dummy gate lines DB1 and DB3 of the first row line and the third row line, and each dummy gate line DB2 and DB4 of the second row line and the fourth row line are selected in this order.

In order to write polarity different black voltages for odd row lines and even row lines each other, the source driver performs the polarity inversion to output the polarity different black voltage each other every one horizontal period (1H). Moreover, since the polarity of the source driver output differs during the immediately preceding horizontal period for writing the image signal, the early gate driving method shown in FIG. 4 can not be adopted.

Instead, in this embodiment, the selected period is set so that the source driver output selects two horizontal periods (2H) of the same polarity periods (2H). That is, the selected period includes a first horizontal period (1H) for writing the image signal and in addition, a second horizontal period (1H') of the same polarity preceding by two horizontal periods (2H) as a preliminary write-in period (1H'). The write-in time to the pixel PX is secured by precharging during the preliminary write-in period (1H').

First, when the first area A1 is focused, while performing the image writing to the sixth row line and the eighth row line, the second row line and fourth row line are precharged. Similarly, while performing the image writing to the fifth row line and the seventh row line, the first row line and third row line are precharged. Similarly, while performing the writing of the image to the second row line and the fourth row line, the first row line and third row line of the dummy region DMT are precharged. Similarly, while performing the image writing to the first row line and the third row line, the second row line and the fourth row line of the dummy region DMT are precharged.

Thus, since precharge is simultaneously performed in other row lines while the image writing is performed for two certain row lines, the source line potential is fluctuated momentarily and an error occurs in the write-in potential in the pixels PX of the two row lines under the image writing operation. However, the amount of the error at this time is same for any of the row lines. On the other hand, in the first row line and the third row line, and the second row line and the fourth row line of the dummy region DMT, since the scan is performed finally, the precharge operation of other row lines are not performed during the image writing. Therefore, the error is not generated in the image write-in potential to the dummy pixels DP for the four row lines.

Similarly, in the second area A2, although a certain quantity of error occurs in the write-in potential in the pixels PX of the 1073rd row line to the 1080th row line of the active area ACT, the error does not occur about the dummy pixels DP of four row lines of the lower dummy region DMB.

Namely, the write-in error does not occur in only the dummy pixels DP of the eight row lines, that is, respective four row lines of the upper dummy region DMT and the lower dummy region DMB in the whole region of the first area A1 and the second area A2. A substantially the same quantity of the error occurs in other row lines, i.e., the pixels PX of the first row line-the 1080th row line which constitute the active area ACT.

Thus, in a case where the dot inversion (or line inversion) is performed, since the amount of error is uniform although the write-in error occurs in the whole active area ACT, it becomes possible to suppress the generation of the horizontal belt-like image. The display unevenness corresponding to the horizontal belt-like image shown in FIG. 2 is respectively generated in the four row lines of the dummy region DMT and in the four row lines of the dummy region DMB. Since the dummy pixels DP are arranged in the respective four row lines and do not contribute to the display, the horizontal belt-like image is not sighted. Therefore, it becomes possible to offer the high quality liquid crystal display device.

In addition, in the above explanation, a package selection of the two row lines is employed in the black insertion scan. However, the drive method with one row line selection, a three-row-line package selection, or a four-row-line package selection is applicable. In the case, each of the dummy regions DMT and DMB which are located on the upper and lower portions of the active area ACT is required to secure the dummy row lines of more than double of row lines which make the package selection for the black insertion. For example, if it is a case of a four-line package selection, the dummy regions DMT and DMB are required to respectively provide eight dummy row lines on the upper and lower sides of the active area ACT.

Figure 8:
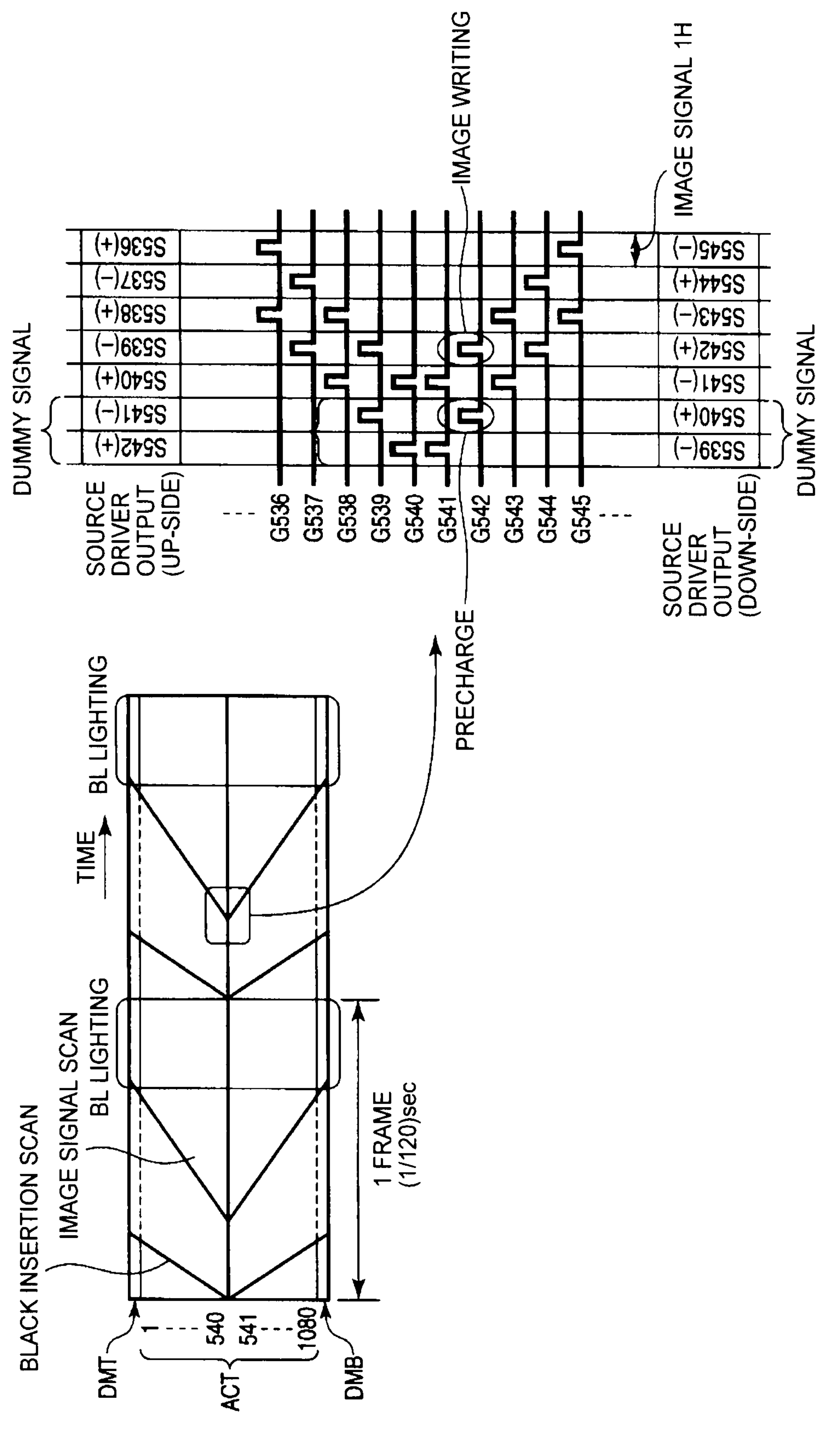
FIG. 8 is a figure showing a gate scan waveform in the start portion of the image signal scan in the scan timing diagram shown in FIG. 7.

FIG. 8 is a figure showing the gate scan waveform near a starting portion of an image signal scan in the scan timing diagram in FIG. 7.

Although the case where the image signal polarity of each row line is the same, i.e., the column inversion or the frame inversion is shown in FIG. 6, FIG. 8 shows a timing chart applied to the dot inversion or the line inversion.

In the image scan, since the image signals corresponding to respective row lines are written in the pixels sequentially, the scan operation is performed to the 540th row line, the 539th row line, the 538th row line, . . . , in this order in the first area A1. Similarly, the scan is performed to the 541st row line, the 542nd row line, the 543rd row line, . . . , in this order in the second area A2. The polarity of the image signals which the source driver DRS outputs is inverted for every one horizontal period (1H).

Also in the image signal scan according to this modification, the precharge operation is performed in a preceding horizontal period of the same polarity by two horizontal periods (2H), and a write-in time to the pixels PX is secured.

The source driver DRS outputs the image signal corresponding to one row line during each 1H period. For example, the image signals S539 and S542 respectively corresponding to the 539th row line and the 542nd row line are simultaneously outputted from the source driver DRS during 1H period for writing image signals. Furthermore, also during 1H period in which only precharge operation is performed without performing the image writing, a predetermined image signal is outputted as a dummy signal in this embodiment.

Namely, during a preceding horizontal period of the 1H period in which the first image signal writing is performed, i.e., during a 1H period in which the upper source driver DRS outputs an image signal S540 and the lower source driver DRS outputs an image signal S541, the upper source driver DRS outputs the image signal S541 and the lower source driver DRS outputs the image signal S540. During further preceding 1H period, the upper source driver DRS outputs an image signal S542 and the lower source driver DRS outputs an image signal S539.

In this structure, all the row lines of the first area A1 are precharged by the image signal corresponding to the row line by two lines down before writing the image signals. This is also the same for the 539th row line and the 540th row line, i.e., the starting scan lines. On the other hand, all the row lines of the second area A2 are precharged by the image signal corresponding to the row line by two lines up before writing the image signals. This is also the same for the 541st row line and the 542nd row line, i.e., the scan starting lines.

When the precharge drive is performed according to above structure to display a gray image in the whole screen of the first and second areas A1 and A2, a stable image signal is always written in the pixels PX through the precharge and the writing of the image signals also in the 540th row line and the 541st row line. For this reason, the writing condition of the potential for the pixels of the scan starting lines also becomes same as the pixels of other row lines. Accordingly, the potential held in each pixel PX also becomes the same as the pixels of the other row lines, and it becomes possible to suppress the generation of the belt-like image in the center of the active area ACT in the image signal scan operation.

In addition, right before outputting the image signal S540, for example, the upper source driver DRS may output the image signal S540 for two horizontal periods (2H), and right before outputting the image signal S541, the lower source driver DRS may output the image signal S541 for two horizontal periods (2H) as a modification of the above-mentioned structure. In the above method to output the same image signals for successive three horizontal periods (3H), the same effect is acquired. Anyway, the same effect is acquired by writing the image signals of any of the row lines in the preliminary write-in period in the selected period of the gate line G540 of the 540th row line and the gate line G541 of the 541st row line.

As explained above, according to the embodiments, a high quality liquid crystal display device can be offered.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A liquid crystal display device, comprising:

a first area including a first gate line group formed of "a" gate lines arranged along a first row line to an a-th row line in an active area, and a first dummy gate line group formed of "b" dummy gate lines arranged outside the active area;

a second area including a second gate line group formed of "c" gate lines arranged along an (a+1)th row line to an (a+c)th row line in the active area, and a second dummy gate line group formed of "d" dummy gate lines arranged outside the active area opposing the first dummy gate line group so as to interpose the active area therebetween; and a driving circuit for sequentially selecting the gate lines from the a-th row line of the first gate line group to the dummy gate line of the first dummy gate line group one by one in the first area, and for sequentially selecting the gate lines from the (a+1)th row line of the second gate line group to the dummy gate line of the second dummy gate line group one by one in the second area;

wherein an image signal and a non-image signal are written within one-frame period in the first and second areas.

2. The liquid crystal display device according to claim 1, wherein a selection period to select the gate lines includes one horizontal period and a preliminary writing period earlier than the horizontal period for writing the image signal in the writing operation of the image signal and the non-image signal.

3. The liquid crystal display device according to claim 2, wherein the selection period of the gate lines of the a-th row line and the (a+1)th row line includes a preliminary writing period in which the image signal of any of the row lines is written as a dummy signal in the writing of the image signal.

4. The liquid crystal display device according to claim 1, wherein a plurality of gate lines are selected simultaneously in the writing of the non-image signal.

5. The liquid crystal display device according to claim 1, wherein the liquid crystal mode is OCB mode.

* * * * *